United States Patent
Shoji et al.

(10) Patent No.: US 7,751,425 B2
(45) Date of Patent: *Jul. 6, 2010

(54) MANAGEMENT DEVICE, MANAGEMENT METHOD, COMPUTER READABLE MEDIUM AND COMPUTER DATA SIGNAL

(75) Inventors: Masahiro Shoji, Kanagawa (JP); Yuichi Kurita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 11/898,743

(22) Filed: Sep. 14, 2007

(65) Prior Publication Data
US 2008/0170585 A1   Jul. 17, 2008

(30) Foreign Application Priority Data
Jan. 17, 2007   (JP)   ............................. 2007-007612

(51) Int. Cl.
*H04L 12/42*   (2006.01)

(52) U.S. Cl. ...................................... 370/449; 709/224

(58) Field of Classification Search ....................... None
See application file for complete search history.

(56) References Cited

U.S. PATENT DOCUMENTS

| | | | | |
|---|---|---|---|---|
| 2005/0283827 | A1* | 12/2005 | Kobayashi | 726/3 |
| 2006/0192997 | A1* | 8/2006 | Matsumoto et al. | 358/1.15 |
| 2007/0288629 | A2* | 12/2007 | Taylor et al. | 709/224 |
| 2008/0170584 | A1* | 7/2008 | Shoji | 370/449 |
| 2009/0106418 | A1* | 4/2009 | Imai | 709/224 |

FOREIGN PATENT DOCUMENTS

JP   A 2003-323360   11/2003

\* cited by examiner

*Primary Examiner*—Phuc Tran
(74) *Attorney, Agent, or Firm*—Oliff & Berridge, PLC

(57) ABSTRACT

A management device comprises: a receiving section that receives, from at least one information processor via a fire wall, a polling signal to inquire if there is a request to send to the information processor or not; and a sending section that sends a response for the polling signal that is received by the receiving section, the response including an instruction to change a sending interval of the polling signal to the information processor.

12 Claims, 4 Drawing Sheets

MANAGEMENT DEVICE, MANAGEMENT METHOD, COMPUTER READABLE MEDIUM AND COMPUTER DATA SIGNAL

CROSS-REFERENCE TO RELATED APPLICATIONS

This application is based on and claims priority under 35 USC 119 from Japanese Patent Application No. 2007-007612 filed Jan. 17, 2007.

BACKGROUND (i) Technical Field

The present invention relates to a management device, a management method, a computer readable medium and a computer data signal.

(ii) Related Art

When a failure is generated in an information processor, this failure may be handled by sending restoration data for recovering the information processor from the failure from an external management device to this information processor. In this case, when a fire wall is provided between the information processor and the management server, even if the management server sends the restoration data to the information processor, this data is blocked by the fire wall. Therefore, regularly carrying out polling from the information processor to a management server, the management server sends the restoration data to the information processor as a response of this polling.

SUMMARY

According to an aspect of the invention, there is provided a management device comprising: a receiving section that receives, from at least one information processor via a fire wall, a polling signal to inquire if there is a request to send to the information processor or not; and a sending section that sends a response for the polling signal that is received by the receiving section, the response including an instruction to change a sending interval of the polling signal to the information processor.

BRIEF DESCRIPTION OF THE DRAWINGS

Exemplary embodiments of the present invention will be described in detail based on the following figure, wherein.

DETAILED DESCRIPTION

Hereinafter, the exemplary embodiment of the present invention will be described with reference to the drawings.

Figure 1:
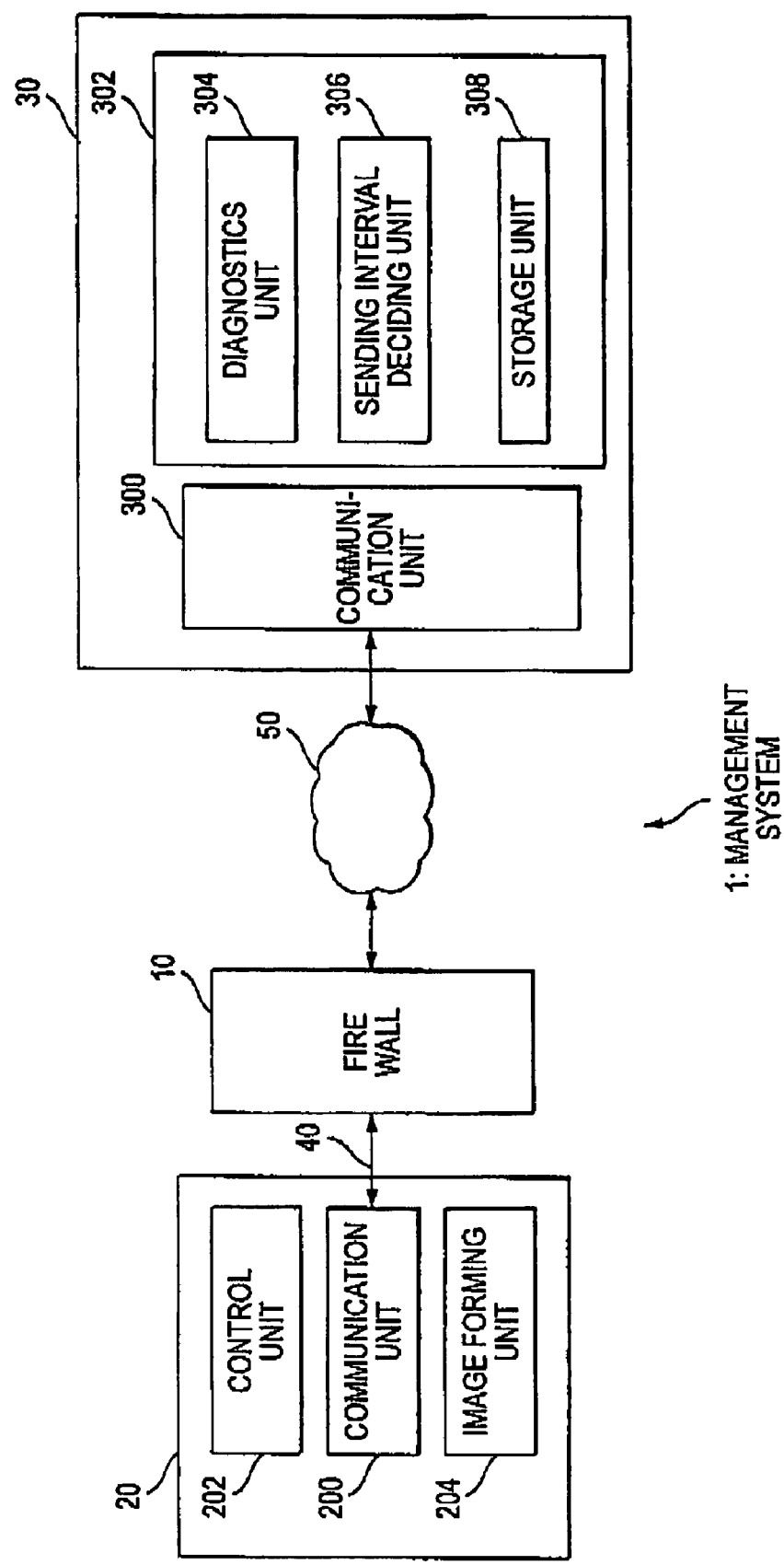
FIG. 1 is a system block diagram of a management system.

FIG. 1 is a system block diagram of a management system 1 according to the present exemplary embodiment. As shown in FIG. 1, the management system 1 may include a fire wall 10, a printer 20, and a management server 30.

The printer 20 is connected to a local area network 40 and the management server 30 is connected to an external network 50. A local network 40 and the external network 50 are connected each other via the fire wall 10. Further, the external network 50 may be Internet, for example.

According to the present exemplary embodiment, the fire wall 10, the printer 20, and the management server 30 may make communication by means of a protocol of a TCP/IP, respectively. Then, an IP address on the basis of the network in the local area network 40 is assigned to the printer 20. In addition, an IP address on the basis of the network system in the external network 50 is assigned to the management server 30.

The fire wall 10 may control communication made between the local area network 40 to which the printer 20 is connected and the external network 50 to which the management server 30 is connected. The fire wall 10 is installed in order to protect the local area network 40 in the interior part of the fire wall from an illegal access from the external network 50. As the fire wall 10, a fire wall provided with a packet filtering function may be used or a fire wall provided with a proxy function may be used. In addition, the fire wall 10 may be incorporated in the printer 20 as software or it may be realized as a dedicated hardware (a firewall server). For example, in the case that the fire wall 10 is a server provided with a packet filtering function, this fire wall 10 may control the communication made between the printer 20 and the management server 30 as follows.

The fire wall server of a packet filtering type may use an address conversion function together with packet filtering. The address conversion function is a function to rewrite addresses of a sending origin and a sending destination of a packet. The address may be designated by an IP address and a port number. For example, in the management system 1 shown in FIG. 1, when the printer 20 accesses the management server 30 over the fire wall 10, the fire wall server rewrites the address of the sending origin, namely, the address of the printer 20. Then, a response of the packet having the address of the sending origin converted is returned from the management server 30, the address of the sending destination, namely, the address of the management server 30 is rewritten by the fire wall server.

Thus, in order to establish the communication via the fire wall, the fire wall server may store an address conversion table in a memory. In this address conversion table, other IP address and other port number for converting one IP address and one port number are stored.

In the fire wall server, it is possible to determine the IP address and the port number for allowing sending to the printer 20 and determine the packet that is directly sent from the outside of the fire wall so as to be blocked. Thus, a signal sent to the printer 20 using the management server 30 as a starting point is blocked by the fire wall server and does not reach the printer 20. On the other hand, when polling is performed from the printer 20 to the management server 30 and as its response, the management server 30 sends the data to the printer 20, it is possible to determine the IP address and the port number that are used for this response so as to able to pass through the fire wall server. In this way, a response signal for polling by means of the management server 30 reaches the printer 20 without being blocked by the fire wall server.

Next, the configuration provided with the printer 20 will be described. As shown in FIG. 1, the printer 20 may include a communication unit 200, a control unit 202, and an image forming unit 204. Each unit can be communicated with each other.

In the communication unit 200, the communication is made with the management server 30 via the fire wall 10. The communication unit 200 is realized by a network interface. As described above, the communication by means of the communication unit 200 is carried out by means of a protocol of a TCP/IP.

The communication unit 200 may send a polling signal to the management server 30 via the fire wall 10. The polling signal is a signal to inquire if there is a request to send to the printer 20 or not. Then, the communication unit 200 may receive a response signal to the polling signal from the management server 30 The details of the response signal from the management server 30 will be described later.

In addition, the communication unit 200 may receive the data of a printing job from a client computer (not illustrated) or the like that is connected to the local area network 40 other than the above-described communication processing.

The control unit 202 may include a central control unit and may control each unit of the printer 20. The control unit 202 may control the image formation processing that is carried out by the image forming unit 204. The control unit 202 may carry out raster processing of the printing data that is received from a client computer in the communication unit 200 so as to generate bit map data. Then, the control unit 202 may transfer the generated bit map data to the image forming unit 204.

Then, if it is detected that a failure is generated upon the image formation processing in the image forming unit 204, the control unit 202 may receive a notification of this. Then, the control unit 202 may generate failure information relating to the detected failure. The control unit 202 may transfer the generated failure information to the communication unit 200, and thereby, the failure information will be sent from the control unit 202 toward the management server 30.

In addition, in the control unit 202, sending of the polling signal to be sent to the management server 30 is controlled. According to the present invention, as control of the polling signal, control of at least its sending interval will be carried out.

The sending interval of the polling signal by means of the printer 20 is determined in accordance with the control signal that is included in the response signal of the polling signal sent from the management server 30. The control signal may include change instruction information to shorten and extend the sending interval of the polling signal than the present sending interval or designation information of the sending interval to directly designate the sending interval.

The image forming unit 204 may form a transcription image on a photosensitive member on the basis of the bit zap data that is transferred from the control unit 202. Then, the transcription image formed on the photosensitive member is transcribed on a print sheet to be fed by a sheet feeding mechanism. The print sheet on which the image is transcribed is discharged from a discharge mechanism. Thus, in the image forming unit 204, the image formation processing is carried out.

When a failure is generated in the process of the image formation processing by means of the image forming unit 204, the generated failure is detected by a predetermined sensor and processing judgment of a predetermined control program. In this case, a predetermined sensor and a predetermined control program may collect the information about the place of the failure and the failure condition. Then, the image forming unit 204 may notify the control unit 202 of the information collected about the place of the failure and the failure condition of the detected failures. For example, the failure generated in the process of the image formation processing may include out of paper, jam of paper, an execution error of a printing job, an abnormality of an optical system, and an abnormality of a sheet feeing motor or the like.

When the failure detected by the image forming unit 204 is notified, the control unit 202 may generate failure information including failure identification information for identifying that failure and failure detailed information indicating the failure place and the failure condition of the collected place of the failure and condition of the failure. The generated failure information is sent toward the management server 30 by means of the communication unit 200.

Next, the configuration of the management server 30 will be described. As shown in FIG. 1, the management server 30 may include a communication unit 300 and a control unit 302. It is defined that respective units can be communicated with each other. Respective units are realized by a hardware to configure a general computer system such as a processor, a memory, a network interface (NIC).

For example, the communication unit 300 is realized by NIC, and it is assumed that the communication unit 300 maybe communicated with other information communication devices through a protocol of a TCP/IP. Then, in the control unit 302, a CPU (a central control unit) may control each unit of the management server 30 in accordance with a command included in a program that is stored in a memory (including a RAM and a ROM or the like) and hard disk or the like. In addition, the above-described program may be provided being stored in a CD-ROM, a DVD-ROM, and a flash memory or other any information recording mediums. In this case, a program may be read from the information recording medium by means of a medium recording apparatus that is connected to the management server 30. In addition, it may be assumed that the program is downloaded via a network.

In the communication unit 300, communication is made with the printer 20 via the fire wall 10. For example, the communication unit 300 may receive the polling signal that is sent from the printer 20. Further, the communication unit 300 may receive the failure information from the printer 20. As described above, the failure information is defined as information including the failure identification information for identifying that failure that is generated in the printer 20 and the failure detailed information indicating the failure place and the failure condition.

In addition, in the communication unit 300, a response signal for the polling signal that is received from the printer 20 is returned to the printer 20 of the sending origin of the polling signal. The response signal may include a control signal for controlling a sending interval of the polling signal to be sent by the printer 20. The control signal may include the change instruction information to shorten and extend the sending interval of the polling signal than the present sending interval or designation information of the sending interval to directly designate the sending interval.

The control unit 302 may include the CPU (the central control unit) and may control each unit of the management server 30. Then, the control unit 302 may further include a diagnostics unit 304, a sending interval deciding unit 306, and a storage unit 308.

The diagnostics unit 304 may diagnose the state of the printer 20 on the basis of the failure information that is received from the printer 20. As described above, the failure information may include the failure identification information for identifying that failure and the failure detailed information indicating the failure place and the failure condition. Then, the diagnostics unit 304 may diagnose the state of the printer 20 on the basis of each information included in the failure information.

The sending interval deciding unit 306 may decide the sending interval of the polling signal that is designated by the printer 20. The sending interval of the polling signal is decided as described below.

The storage unit 308 may store the address conversion table relating the sending intervals with each other for each state of the printer 20. Then, being related to the state of the printer 20 that is diagnosed by the diagnostics unit 304, the storage unit 308 may read the sending intervals to be stored in the storage unit 308. The read sending interval is defined as a sending interval of the polling signal that is designated by the printer 20.

In the case that plural failure states are mixed as being diagnosed by the diagnostics unit 304, the sending interval may be selected in accordance with a predetermined condition, for example, the shortest one among the sending intervals stored related to each state may be selected.

In addition, it is assumed that the restoration data for restoring the state into a normal state may be further stored for each state of the failure of the printer 20 in the storage unit 308. Then, in accordance with the state that is diagnosed by the diagnostics unit 304, the restoration data for restoring the state into the normal state may be read from the storage unit 308. The read restoration data may be sent being included in the response of the polling signal that is sent by the printer 20.

Figure 2:
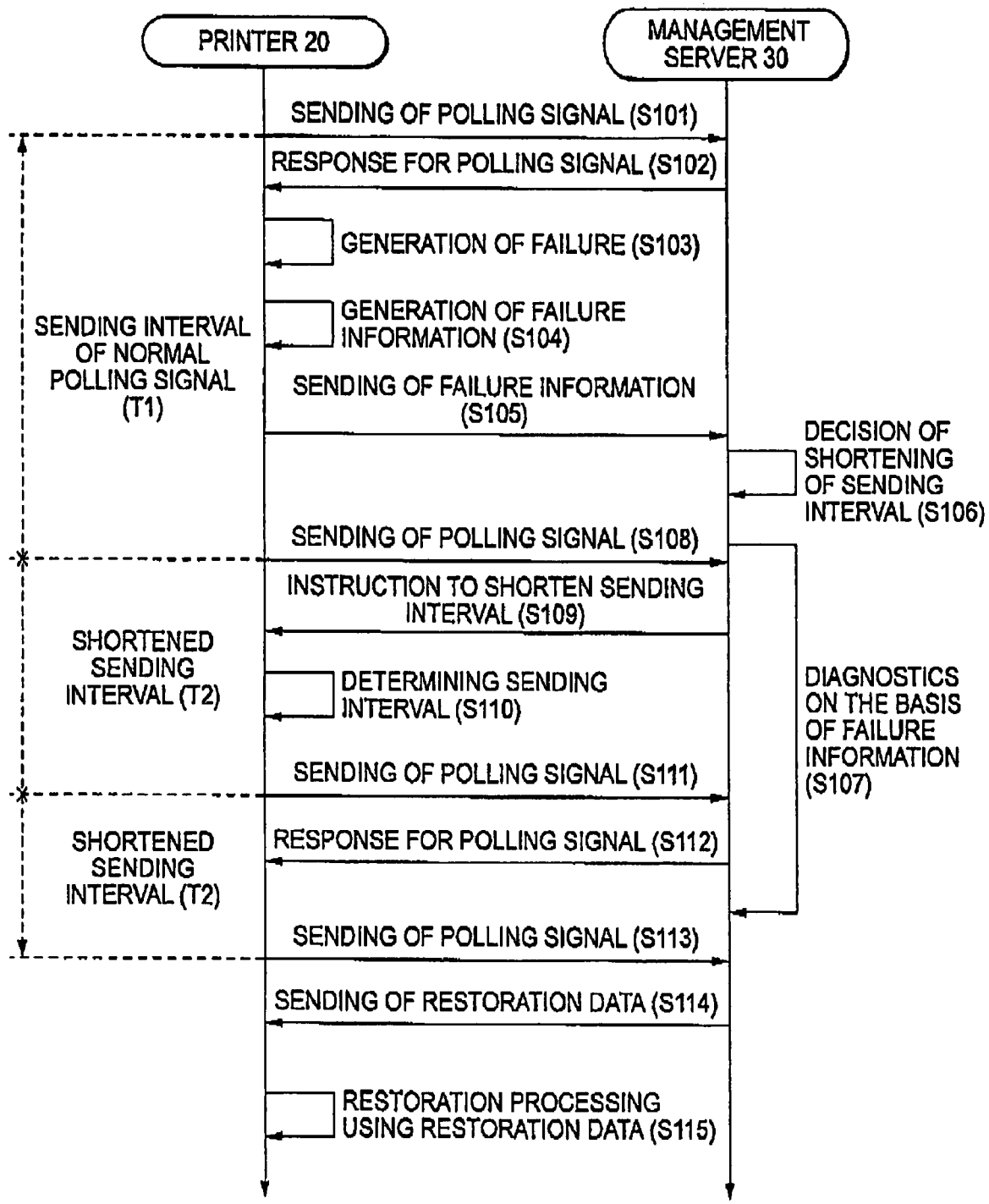
FIG. 2 is a view showing an example of a sequence of the processing in the management system.
Figure 3:
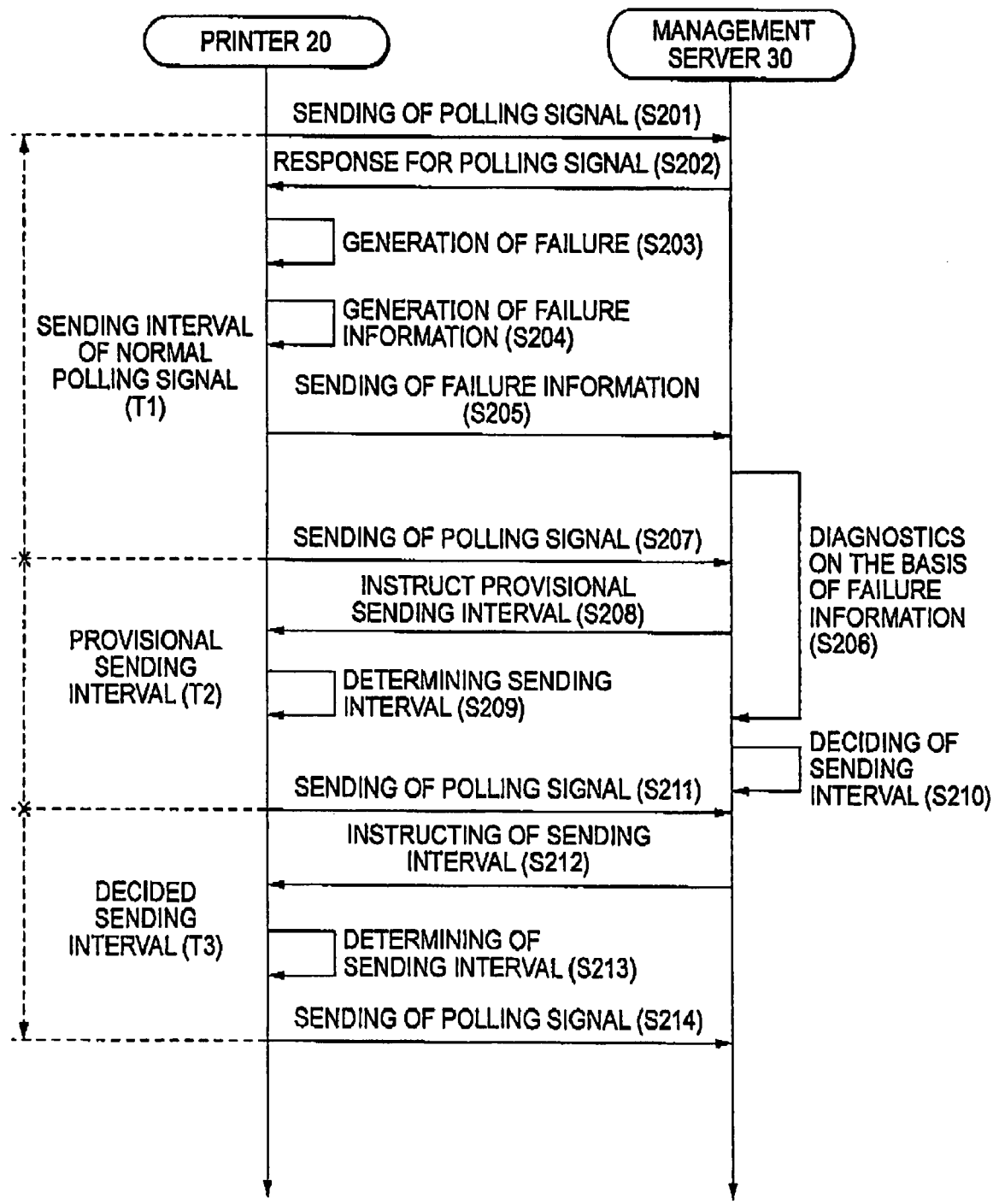
FIG. 3 is a view showing an example of a sequence of the processing in the management system.
Figure 4:
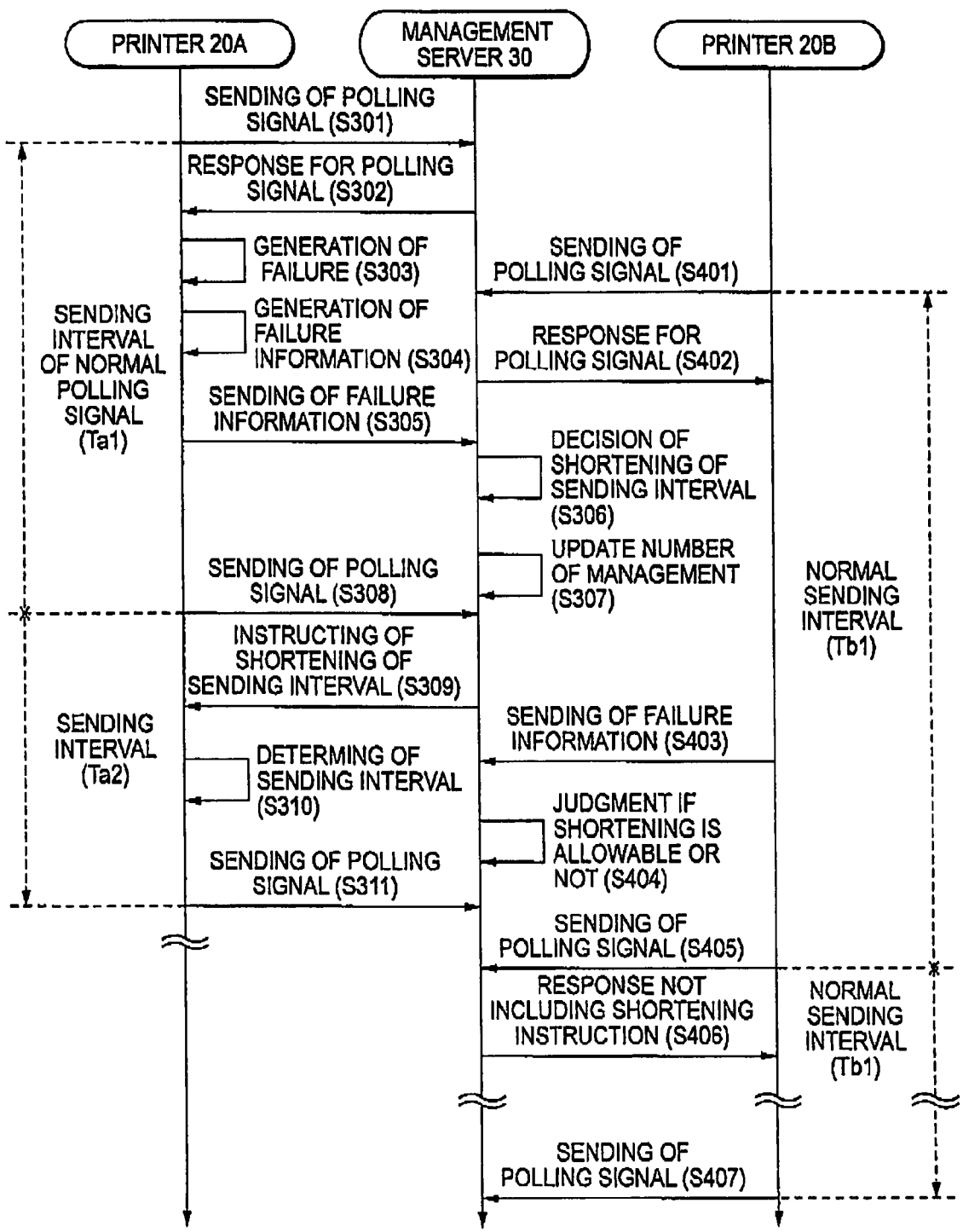
FIG. 4 is a view showing an example of a sequence of the processing in the management system.

Each of FIGS. 2 to 4 is a sequence view of the control processing related to the polling signal in the management system 1. Hereinafter, with reference to each diagram, flows of the processing (they are defined as first, second, and third sequences, respectively) to be carried out in the management system 1 will be described.

At first, with reference to FIG. 2, the first sequence will be described.

The printer 20 may send the polling signal to the management server 30 at a predetermined frequency (T1) (S101). In this way, the printer 20 may inquire at the management server 30 if there is a request to send to the printer 20 or not. Then, if there is the sending data of a control signal to be sent to the printer 20 or the like, as the response of the received polling signal, the management server 30 may send this sending data to the printer 20 (S102).

If generation of a failure is detected in the printer 20 (S103), on the basis of the detected failure, the failure information is generated (S104). The generated failure information is sent to the management server 30 from the printer 20 (S105). The failure information may be sent at the same time when the polling signal is sent or it may be sent at timing that is different from sending of the polling signal.

According to the example of the first sequence, it is defined that, when the information received from the printer 20 is the failure information, the management server 30 makes the printer 20 that sent the failure information to shorten the sending interval of the polling signal (S106). In addition, the management server 30 may diagnose the state of the printer 20 on the basis of the received failure information (S107).

If the polling signal is sent from the printer 20 when the diagnostic processing has been done on the basis of the failure information (S108), the management server 30 may send a control signal including an instruction to shorten a polling interval being included in the response of the polling signal (S109). This instruction may be an instruction to change the present value of the polling signal into the shorter sending interval or it may be an instruction of specific numeric values of the sending interval to be determined.

The printer 20 may receive a signal including a command to shorten the polling interval from the management server 30. Then, the printer 20 may determine the sending interval of polling to be shortened (S110). Here, in the case that the sending interval of the polling signal is instructed, the instructed sending interval is determined as a sending interval of the polling signal. The printer 20 may send the polling signal to the management server 30 at the shortened sending interval (T2) (S111), and may receive the response to the polling signal from the management server 30 (S112).

If the management server 30 may read the restoration data for restoring the state of the diagnosed failure into a normal state from the storage unit 308 if the above-described diagnostic processing (S107) is completed. Then, the management server 30 may send the response for the polling signal to be sent from the printer 20 after that (S113) including the read restoration data (S114).

The printer 20 may receive the restoration data that is sent being included in the response of the polling signal from the management server 30. Then, the printer 20 may carry out the restoration processing in order to restore the state of the generated failure into a normal state by using the received restoration data (S115).

Next, with reference to FIG. 3, a second sequence to be carried out in the management system 1 will be described. The second sequence is different from the first sequence in the following points. In other words, the management server 30 provisionally instructs the shortened sending interval to the printer 20 if the management server 30 receives the failure information from the printer 20. Then, the management server 30 may decide the sending interval of the polling signal again after the result of this diagnostics is obtained and may notify the printer 20 of this sending interval of the polling signal.

The printer 20 may send the polling signal to the management server 30 at a predetermined sending interval (T1) (S201), and may receive this response (S202). Then, when generation of the failure is detected in the printer 20 (S203), on the basis of the detected information, the failure information is generated (S204). The generated failure information is sent to the management server 30 by means of the printer 20. The generated failure information is sent to the management server 30 from the printer 20 (S205).

The management server 30 may receive the failure information from the printer 20. Then, the management server 30 may diagnose the state of the printer 20 on the basis of the received failure information (S206).

When the printer 20 sends the polling signal to the management server 30 when the diagnostic processing has been carried out on the basis of the failure information (S207), the management server 30 may send the instruction to provisionally shorten the sending interval of the polling signal being included in the response of the polling signal (S208).

The printer 20 may receive the above-described response from the management server 30 (S209), and may determine the sending interval of the polling signal on the basis of the instruction included in this response (S209).

The management server 30 may decide the sending interval of the polling signal on the basis of the results of the diagnostics of the above-described diagnostic processing (S206) (S210). Here, the sending interval of the appropriate polling signal (for example, T3) is decided in accordance with the failure information that is received from the printer 20. If it is diagnosed that the sending interval of the polling signal is necessarily shorten more due to the above-described diagnosing, the sending interval may be further shortened. In the case that it is diagnosed that this failure is a light failure, the sending interval of the polling signal may be returned to a normal interval.

Then, if the management server 30 receives the polling signal that is sent from the printer 20 (S211), the management server 30 may send the response for this including a changing instruction of the decided sending interval of the polling signal (S212).

The printer 20 may receive the response signal including the changing instruction of the sending interval of the polling signal from the management server 30 (S211). Then, the printer 20 may determine the sending interval of the polling signal on the basis of the received changing instruction (S213). Here, in the case of receiving the information designating the sending interval of the polling signal, the printer 20 may determine the sending interval of the polling signal at that interval. Then, at the determined sending interval (T3), the printer 20 may send the polling signal to the management server 30 (S214).

At last, with reference to FIG. 4, a third sequence to be done in the management system 1 will be described. In the third sequence, the case that plural printers 20A and 20B and the management server 30 are communicated with each other is assumed. In this third sequence, providing an upper limit value to the number of the printer 20 of which sending interval is changed (shortened) so as to control a load of the management server 30.

Specifically, storing the number of the printer 20 having the sending interval of the polling signal changed (shortened) in the storage unit 308, the management server 30 may manage it. In addition, the management server 30 may store the upper limit value of the number of the printer 20 having the sending interval of the polling signal shortened in the storage unit 308. Then, if it is determined that the number of the printer 20 having the sending interval of the polling signal changed (shortened) attains to the upper limit value stored in the storage unit 308, during this time, the management server 30 is controlled so as not to instruct change of the sending interval of the polling signal for the printer 20.

The printer 20A may send the polling signal to the management server 30 at a predetermined interval (Ta1) (S301) and may receive its response (S302). Then, if generation of the failure is detected in the printer 20A (S303), on the basis of the detected failure, the failure information is generated (S304). The generated failure information is sent to the management server 30 by means of the printer 20A (S305).

With reference to the storage unit 308, in the case that the number of the printer 20 having the sending interval of the polling signal shortened does not reach to the upper limit value, it is decided that the sending interval of the polling signal by means of the printer 20A is shortened (S306). According to the example of this third sequence, it is assumed that the number of the printer 20 having the sending interval of the polling signal shortened does not reach to the upper limit value. Then, the management server 30 may update the number of the printer 20 having the sending interval of the polling signal changed (shortened) to be stored in the storage unit 308 (S307). Thereby, according to the above-described example, it is assumed that the number of the printer 20 having the sending interval of the polling signal shortened reaches to the upper limit value.

Then, the management server 30 may send the instruction to shorten the sending interval of the polling signal for the printer 20A being included in the response of the polling signal (S308, S309).

The printer 20A may receive the above-described response from the management server 30 and may determine a sending interval (Ta2) of the polling signal on the basis of the instruction included in this response (S310). Then, the printer 20A may send the polling signal to the management server 30 at the determined sending interval (Ta2) (S311).

The printer 20B may send the polling signal to the management server 30 at a predetermined sending interval (Tb1) (S401), and may receive its response (S402).

Then, in the case that the printer 20B sends the failure information to the management server 30 (S403), it is determined if the number of the printer 20 having the sending interval of the polling signal shortened reaches to the upper limit value or not on the basis of the number and its upper limit value of the printer 20 that have been already managed in the storage unit 308 (S404). According to this example, since the number of the printer 20 having the sending interval of the polling signal shortened reaches to the upper limit value as described above, the management server 30 may decide not to instruct shortening of the polling signal to the printer 20B.

In this way, the response to the polling signal to be sent from the management server 30 (S405) does not include a shortening instruction of the polling signal (S406).

Therefore, the printer 20B may carry out polling for the management server 30 at the sending interval (Tb1) of a normal polling signal (S407). However, in the case that at least one of the printers 20 having the sending intervals of the polling signal shortened terminates polling at its shortened sending interval, the printer 20 may be allowed to instruct so as to shorten the sending interval of the polling signal.

Further, the present invention is not limited to the above-described exemplary embodiment.

For example, a level of importance may be determined in advance for each failure dividing the generated failures by means of the printer 20. Then, the communication unit 300 may carry out simple diagnostics for the failures included in the received failure information on the basis of the determined level of importance, and in accordance with a result of this diagnostics, it may be decided if the sending interval of the polling signal is shortened or not.

In addition, it is obvious that the present invention can be also applied to other information processor such as a personal computer not limited to a printer (an image processing apparatus).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management device comprising:
   a receiving section that receives, from at least one information processor via a fire wall, a polling signal to inquire if there is a request to send to the information processor or not;
   a sending section that sends a response for the polling signal that is received by the receiving section, the response including an instruction to change a sending interval of the polling signal to the information processor;
   a managing section that manages a number of information processors having the sending interval of the polling signal changed; and a limiting section that limits the sending of the instruction to change the sending interval of the polling signal in a case that the number of information processors managed by the managing section reaches to a predetermined number.

2. The management device according to claim 1, wherein the sending section sends an instruction to shorten the sending interval of the polling signal included in the response when failure information indicating the failure that is generated in the information processor is received from the information processor.

3. The management device according to claim 2, wherein the failure information includes a classification of failures; and
the sending section sends an instruction to shorten the sending interval of the polling signal being included in the response in accordance with the classification of failures.

4. The management device according to claim 2, further comprising:
a diagnosing section that diagnoses a state of the information processor based on the failure information,
wherein the sending section sends the information in accordance with the state that is diagnosed by the diagnosing section being included in the response.

5. The management device according to claim 4, wherein the sending section sends an instruction to further change the sending interval of the polling signal being included in the response in the case that the state of the information processor is diagnosed to be a predetermined state.

6. The management device according to claim 1, further comprising:
a deciding section that decides the sending interval of the polling signal,
wherein the sending section sends the sending interval decided by the deciding section included in the response.

7. A management method comprising:
receiving, via a fire wall, a polling signal to inquire if there is a request to send or not;
sending a response for the received polling signal, the response including an instruction to change a sending interval of the polling signal;
managing a number of information processor having the sending interval of the polling signal changed; and
limiting the sending of the instruction to change the sending interval of the polling signal in the case that a number of information processor managed by the managing section reaches to a predetermined number.

8. A computer non-transitory readable medium storing a program causing a computer to execute a process for managing, the process comprising:
receiving, via a fire wall, a polling signal to inquire if there is a request to send or not;
sending a response for the received polling signal, the response including an instruction to change a sending interval of the polling signal;
managing a number of information processor having the sending interval of the polling signal changed; and
limiting the sending of the instruction to change the sending interval of the polling signal in a case that the number of information processor managed by the managing section reaches to a predetermined number.

9. A management device comprising:
a receiving section that receives, from at least one information processor via a fire wall, a polling signal to inquire if there is a request to send to the information processor or not;
a sending section that sends a response for the polling signal that is received by the receiving section, the response including an instruction to change a sending interval of the polling signal to the information processor; and
a diagnosing section that diagnoses a state of the information processor based on the failure information,
wherein the sending section sends an instruction to shorten the sending interval of the polling signal included in the response when failure information indicating the failure that is generated in the information processor is received from the information processor, and sends restoration data in accordance with the state that is diagnosed by the diagnosing section being included in the response, the restoration data including information to restore the state of the information processor to a normal state.

10. The management device according to claim 9, wherein the failure information includes a classification of failures; and
the sending section sends an instruction to shorten the sending interval of the polling signal being included in the response in accordance with the classification of failures.

11. The management device according to claim 9, wherein the sending section sends an instruction to further change the sending interval of the polling signal being included in the response in the case that the state of the information processor is diagnosed to be a predetermined state.

12. The management device according to claim 9, further comprising:
a deciding section that decides the sending interval of the polling signal,
wherein the sending section sends the sending interval decided by the deciding section included in the response.

* * * * *